United States Patent [19]

Löthman

[11] Patent Number: 4,682,684
[45] Date of Patent: Jul. 28, 1987

[54] METHOD AND AN ARRANGEMENT FOR THE FEEDING OF OBJECTS

[75] Inventor: Stig A. Löthman, Veberöd, Sweden
[73] Assignee: Tetra Pak International AB, Lund, Sweden
[21] Appl. No.: 749,115
[22] Filed: Jun. 26, 1985

Related U.S. Application Data

[63] Continuation of Ser. No. 335,597, Dec. 30, 1981, abandoned.

[30] Foreign Application Priority Data

Jan. 19, 1981 [SE] Sweden .................................. 8100247

[51] Int. Cl.⁴ ............................................ B65G 47/31
[52] U.S. Cl. ...................................... 198/461; 198/732
[58] Field of Search ............... 198/461, 732, 425, 606, 198/459

[56] References Cited

U.S. PATENT DOCUMENTS

| | | | |
|---|---|---|---|
| 3,053,373 | 9/1962 | Cross et al. | 198/606 X |
| 3,650,566 | 3/1972 | Lee et al. | 198/461 X |
| 3,677,686 | 7/1972 | Powel | 198/732 X |
| 3,827,211 | 8/1974 | Zavatone et al. | 198/425 X |
| 4,019,624 | 4/1977 | Torres | 198/459 |
| 4,369,875 | 1/1983 | Schmitz | 198/461 X |

FOREIGN PATENT DOCUMENTS

| | | |
|---|---|---|
| 2294946 | 7/1974 | France . |
| 523172 | 7/1972 | Switzerland . |
| 1334267 | 10/1973 | United Kingdom . |
| 1545058 | 5/1979 | United Kingdom . |

Primary Examiner—Robert J. Spar
Assistant Examiner—D. Glenn Dayoan
Attorney, Agent, or Firm—Burns, Doane, Swecker & Mathis

[57] ABSTRACT

A method and an arrangement for the feeding or transfer of objects from a first to a second conveyor, the latter being driven at a higher constant speed than the first conveyor. In such a transfer of objects between conveyors equipped with driving or load contacting elements, damage to the objects is avoided if these are given a temporary increase in speed at the moment of transfer. The increase in speed occurs because the driving element of the first conveyor is tipped forward directly before the transfer in the direction of movement of the conveyor, so that the total speed of the object at the moment of transfer substantially corresponds to the speed of the second conveyor.

18 Claims, 2 Drawing Figures

METHOD AND AN ARRANGEMENT FOR THE FEEDING OF OBJECTS

This application is a continuation of application Ser. No. 335,597, filed 12/30/81 now abandoned.

BACKGROUND AND SUMMARY OF THE PRESENT INVENTION

The present invention relates generally a method and an apparatus for conveying objects. More specifically, the present invention relates to a method for the transfer with successive increase of speed of an object from a first conveyor driven at constant speed to a second conveyor driven at a higher constant speed.

The invention also relates to a feeding arrangement for objects delivered at regular intervals. The feeding arrangement has a first conveyor with an endless conveyor belt equipped with projecting driving elements positioned at regular intervals, and a second conveyor.

In the packaging industry, for example, frequently more or less finished packing containers are moved between different processing machines or processing stations by conveyors. To ensure an accurate coordination of the packing containers moved forward in relation to the subsequent processing machine, the conveyors are often provided with driving elements which make possible the feeding of the packing containers at predetermined intervals. In the transfer of packing containers from a slower to a faster conveyor it has been found difficult to prevent the feeding elements of the faster conveyor from damaging or deforming the packing containers, especially if the speed difference between the conveyors is great or if the packing containers are not yet finished.

It is one main object of the present invention to provide a method by which, in the packaging industry as well as in other fields, objects can be fed or transferred from a first relatively slowly moving conveyor to a second relatively fast moving conveyor without the object being deformed or damaged in some other manner and without more comprehensive, complicated and expensive technical solutions having to be adopted.

This and other objects have been achieved in accordance with the invention by a method for the transfer, with successive increase of speed, of an object from a first conveyor driven at constant speed to a second conveyor driven at a higher constant speed. The object is fed by a driving or load-contacting element positioned on the conveyor belt of the first conveyor with the element, at the end of the active portion of the first conveyor (i.e., the point at which the first conveyor ceases moving the object), being tipped forward so as to impart to the object an increase of speed before the feeding is taken over by the second conveyor. In this manner the object fed by the driving elements of the first conveyor will be accelerated to a higher speed than the basic speed of the conveyor directly before the object is transferred to and is driven by the driving elements of the second, faster conveyor. In this way the speed difference between the object and second conveyor is appreciably diminished so that the transfer can take place without jerks or impacts causing damage to the object.

A preferred embodiment of the method in accordance with invention has been given the further characteristic that the forward tipping of the driving element is effected by causing the conveying track to change its direction of movement.

A further preferred embodiment of the method in accordance with the invention has been given the further characteristic that the speed of the first conveyor plus the additional speed caused by the driving element give a combined speed which substantially corresponds to the speed of the second conveyor.

A further object of the present invention is providing an arrangement for the execution of the method in accordance with the invention.

A still further object is providing a feeding arrangement within which individual objects can be transferred from a first relatively slow conveyor to a second, faster conveyor without being damaged, deformed or detrimentally affected in some other way.

A yet further object is providing a feeding arrangement of the abovementioned type which is of a simple and reliable design and which can readily be combined with known feeding arrangements.

These and other objects have been achieved in accordance with the invention by a feeding arrangement having a first conveyor with an endless conveyor belt which is provided with projecting driving elements positioned at regular intervals and a second conveyor. The first conveyor has devices adapted for changing the orientation of the driving elements in relation to the direction of movement of the active portion of the conveyor. This design makes it possible, through a change in the orientation of the driving elements, to impart to the conveyed objects a speed during part of their movement along the active portion of the conveyor which differs from the actual speed of the conveyor. A conveyed object can be given a higher speed, for example, at the end of the active portion of the conveyor by forward tipping of the driving elements in the direction of movement. This characteristic can be made use of, for example, for imparting to the object a total speed which corresponds to the speed of the subsequent conveyor.

BRIEF DESCRIPTION OF THE DRAWINGS

A preferred embodiment of the method and of the arrangement in accordance with the invention will now be described in more detail with special reference to the attached schematic drawings in which.

DESCRIPTION OF THE PREFERRED EMBODIMENTS

Figure 1:
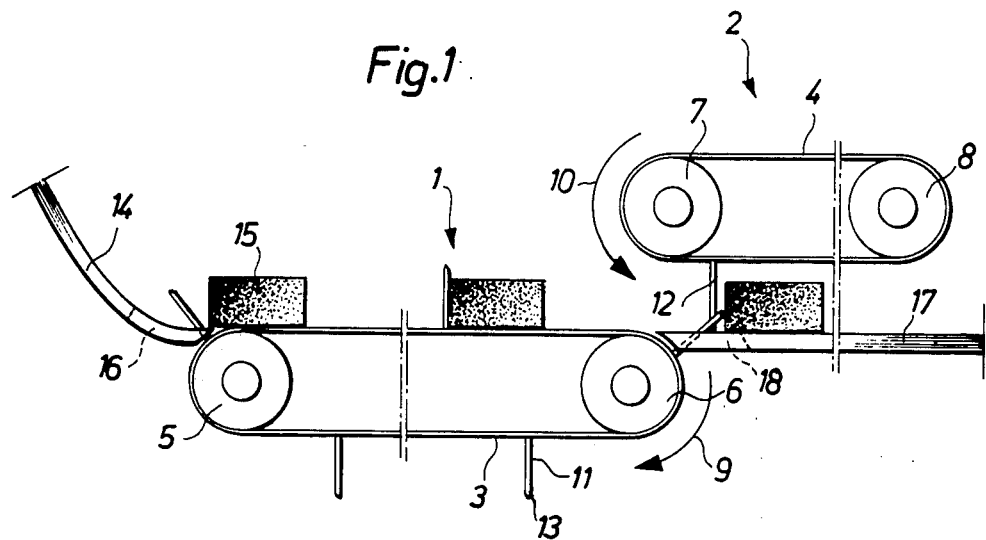
FIG. 1 is a schematic side view of a preferred embodiment of a feeding arrangement in accordance with the invention.

The preferred embodiment of the feeding arrangement in accordance with the invention as shown in FIG. 1 includes a first conveyor 1 and a second conveyor 2 which extend substantially in the same direction, but are displaced in respect of one another, so that the front end of the second conveyor is practically adjacent to the tail end of the first conveyor. The basic design of the two conveyors 1,2 is conventional and each of the conveyors has an endless conveyor belt 3,4 which in a known manner consists of one or more chains, straps or the like. The conveyor belts 3,4 in each of the conveyors 1,2 run over conventional first and second end pulleys 5,6 and 7,8 respectively. One pulley in each conveyor is driven at constant speed by an electric motor, not shown, or by some other known driving unit. The direction of movement of the conveyor 1 is indicated on the drawing by a first arrow 9, and the direction of movement of the conveyor 2 is indicated by a second arrow 10.

The conveyor belt 3,4 of the first as well as of the second conveyor include first and second projecting driving elements or load-contacting elements 11 and 12 respectively positioned at regular intervals. The driving elements 11,12 are of elongated shape and are arranged substantially right-angled to the surface of the conveyor belt 3,4. Each driving element 11,12 consists of one or more plates or bars which are positioned at intervals over parts of the total width of the conveyor belt 3,4. The plates or bars forming the first driving element 11 are laterally displaced in relation to the bars or plates of the second driving element 12, which makes it possible for the driving elements to engage and to pass each other without obstruction in the area where the conveyors 1,2 meet one another first. Each driving element 11 on the conveyor belt 3 of the first conveyor 1 or each individual unit included in the driving element 11 is provided at the outer end of its front side, seen in the direction of feed, with a curved or convex contact surface 13. The length of the first driving element 11, that is to say the perpendicular distance between the conveyor belt and the outermost end or contact surface of the driving element in the preferred embodiment of the arrangement in accordance with the invention is greater than the radius of the second end pulley 6. More particularly, it is preferred, for reasons which will be explained in more detail in the following, that the driving element 11 should be 1 to 3 times longer than the radius of the second end pulley 6.

The abovementioned relation between the length of the driving element 11 and the radius of the second end pulley 6 is dictated by the circumstance that, the second end pulley 6 is situated at the tail end of the active portion of the conveyor and not only acts as a conventional end pulley, but also serves as a device for changing the orientation of the driving element 11 in relation to the direction of movement of the active portion of the conveyor 1. This change of orientation consists in particular of a tipping forward of the driving element 11 in the direction of movement of the conveyor 1, which momentarily influences the conveyed object so that a higher speed is imparted to the same than that of the conveyor belt 3. It has been found that optimum function can be obtained if the relation of the length of the driver 11 to the radius of the second end pulley 6 is as stated, that is to say if it is 1 to 3 times greater than the radius.

At the front end of the first conveyor (to the left in FIG. 1) can be seen a delivery chute 14 for the objects 15 which are to be conveyed by the feeding arrangement in accordance with the invention. The delivery chute 14 is arranged so that its tail end directly adjoins the starting end of the active upper portion of the first conveyor 1 and is provided in the said end with cutouts 16 which make it possible for the driving elements 11 to pass the tail end of the delivery chute 14 without being obstructed. The shape and the positioning of the cutouts 16 will be adapted, of course, to the shape and positioning of the driving elements 11 on the conveyor belt 3. At the opposite end or tail end of the first conveyor (to the right in the figure) a device comprising a feeding out surface 17 is present which is situated directly adjoining the tail end of the active portion of the first conveyor and is provided, similarly to the delivery chute 14, with cutouts 18 to permit an unhindered passage of the driving elements 11 of the conveyor belt 3. The feeding out surface 17 constitutes a direct continuation of the upper, active portion of the first conveyor 1, and the second conveyor 2 extends substantially parallel with the prolongation of the first conveyor 1 as well as with the feeding out system 17. The mutual distance between the active portions of the conveyors 1,2 facing each other (i.e., a point at which the first conveyor 1 ceases moving the object 15 and a point at which the second conveyor 2 begins moving the object) is equal to, or slightly greater than, the length of the first driving elements 11.

The preferred embodiment of the feeding arrangement in accordance with the invention shown in FIG. 1 and the manner in which it is applied will now be described in greater detail. In this context the method and the arrangement are shown and described as used in the packaging industry and more particularly in the manufacture of packing containers for fluid contents, where the arrangement is used for the transfer of partly finished packing containers from a first machine part to a second machine part. In doing this it is desirable to increase during the transfer the distance between the packing containers fed out in rapid succession from the first machine part, so as to facilitate the feeding into the subsequent machine part. The second conveyor is then operated at practically twice the speed as the first conveyor and the arrangement works in the following manner.

The partly formed packing containers or objects 15 are delivered to the first conveyor 1 via the delivery chute 14 onto which they are fed out from the first machine part. The objects 15 slide down the chute 14 by gravity to stop near the end of the chute owing to the diminishing slope of the chute 14. When the conveyor belt 3 of the first conveyor 1 is driven in the direction indicated by the arrow 9, one of the first driving elements 11, fitted at regular intervals along the conveyor belt 3, will engage with the rear end of the packing container or object 15 and drive the object onto the active portion of the conveyor 1. Thanks to the cutout 16 in the tail end of the delivery chute, the driving element 11 can pass the chute 14 freely and engage with the object 15.

The object 15 is then moved at a constant speed along the upper, active portion of the conveyor which may be of the required length. When the conveyed object 15 approaches the tail end of the conveyor 1 (to the right on the drawing), it is to be transferred to the second conveyor 2 which subsequently takes over the driving and at approximately twice the speed of conveyor 1 moves the object to the second processing machine. Since the packing containers are not yet finished, they are vary damageable and the transfer between the conveyors working at different speeds therefore has to take place without abrupt increases in speed, jerks or impacts on engagement between the second driving elements 12 of the second conveyor 2 moved forward at a relatively high speed and the packing container. This is prevented in accordance with the invention in that the driving element 11 of the first conveyor 1 at the end of the first conveyor is tipped forward so that an increase of speed is imparted to the object 15 directly before the feeding is taken over by the second conveyor 2. In the preferred embodiment shown, the re-orientation or tipping forward of the actual driving element 11 is brought about because the conveyor belt 3 is made to change direction of movement when it approaches the second end pulley 6. The outer end or contact surface 13 of the driving element 11 will thus be given additional speed which, together with the basic speed of the conveyor, will accelerate the moved object 15 so that when it is moved out onto the feeding out surface 17, positioned in the prolongation of the active portion of conveyor 1, it has a linear speed which substantially corresponds to the linear speed of the second conveyor 2. The speed of the object 15 over the feeding out surface 17 can be adapted to the speed of the second conveyor through adjustment of the length of the driving element in relation to the radius of the second end pulley 6. The principle here is that a driving element of a greater length or an end pulley of a smaller diameter impart a greater increase of linear speed to the object. In practice, however, the possible increase of speed is limited by the capacity of the object 15 to endure the acceleration, and it has been found appropriate in the case of packing containers to select a length of driving element which is 1 to 3 times greater than the radius of the second end pulley 6. During the transport of the object 15 along the plane part of the active portion of the first conveyor 1 the first driving element 11 will usually extend above the upper limiting surface of the object so that when the driving element is moved along the periphery of the second end pulley 6 it slides downwards along the rear limiting surface of the object 15, seen in the direction of movement. At the same time the object is accelerated to a speed which is approximately twice as great as the linear speed of the first conveyor 1, that is to say a speed which substantially corresponds to the linear speed of the second conveyor 2. Directly before the contact surface 13 of the first driving element 11 leaves the rear surface of the object 15 and passes down through the cutout 18 in the feeding out surface 17, the second driver 12 of the conveyor belt 4 will come to rest against the object 15 and take over the further movement of the object along the feeding out surface 17. The feeding out surface 17 terminates in a feeding in pocket (not shown on the drawing) in the subsequent processing machine, to which the packing containers or objects are thus fed at substantially twice as long intervals as when they are fed out from the first processing machine.

The preferred embodiment which has been described of the method and arrangement in accordance with the invention makes it possible without complicated and expensive mechanical structures gently to accelerate a conveyed object during the movement from a first conveyor of relatively low speed to a second conveyor of higher speed. In practice this has been found to be readily applicable and the arrangement has been proved to function well in practical trials.

Since in the embodiment of the arrangement in accordance with the invention described above the second end pulley 6 is used as the device which controls the change of orientation of the first driving element 11, the tipping of the driving elements must take place at a part of the conveyor which is provided with a pulley, that is to say usually at the two ends of the conveyor. If a temporary acceleration or retardation of an object moved on the conveyor is to take place in an area of the conveyor which does not pass over an end pulley, this may be realized by a second embodiment of the arrangement in accordance with the invention which is illustrated in FIG. 2 and described in more detail in the following.

Figure 2:
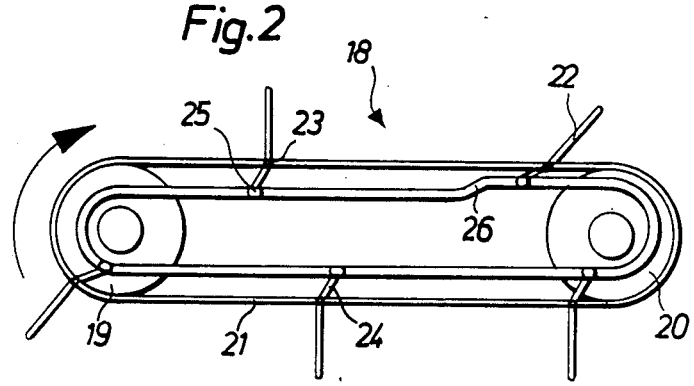
FIG. 2 is a schematic side view of a second embodiment of a part of the feeding arrangement in accordance with the invention. For the sake of making the drawings clearer, only the details necessary for understanding the invention have been included.

In FIG. 2 only one conveyor 18 is shown, corresponding to the first conveyor 1 in FIG. 1. Other parts of the arrangement may be of the same design as in the embodiment shown in FIG. 1 and are not described in greater detail. Like the first conveyor 1, the conveyor 18 comprises two end pulleys 19,20 over which passes an endless conveyor belt 21. The conveyor belt 21, like the conveyor belt 3 in FIG. 1, may be in the form of a chain, for example, which carries driving elements 22 fitted at a regular pitch. The driving elements 22 are in the form of fingers or arms which are attached to the conveyor belt 21 so that they can swivel about axles 23 which are parallel to one another and parallel to the axes of rotation of the end pulleys 19 and 20. Each driving element 22 is provided with an arm or control part 24 projecting on the opposite side of the axle or the conveyor belt 21 which at its end has a roller 25. During the movement of the conveyor belt the rollers 25 run along a cam 26 which extends along the whole length of the belt 21. The distance between the cam 26 and the conveyor belt 21 is constant, except for the part of the active portion of the conveyor belt 21, where the orientation of the driving element 22 in relation to the direction of movement of the conveyor belt is to be changed. Within the said area the cam 26 and the conveyor belt 21 draw nearer towards each other, so that the driving elements 22 are tipped forward by the rollers 25 and control parts 24 running along the cam 26 in the direction of movement of the conveyor. As a result the required increase of the speed of movement of the conveyed object 15 and the subsequent working moment are obtained, e.g. the transfer of the object 15 to a faster conveyor can take place without hindrance.

Although the embodiment of the arrangement described in FIG. 2 is of a more complicated and hence somewhat more expensive design, it offers certain advantages over the preferred embodiment shown in FIG. 1, which advantages under certain circumstances can make up for the disadvantages conditioned by the construction. Thus, for example, the temporary acceleration of the conveyed objects may take place at any desired part of the whole length of the conveyor. The course of the acceleration and the total final speed of the object can be controlled very accurately, and independently of such factors as the diameter of the end pulleys, and it is also possible to provide a negative acceleration of the objects, should this be desired.

A feeding arrangement in accordance with the invention can be combined, of course, with a number of different types of conveyors, and it is also possible to orientate the conveyors in a different manner to that shown in the figures. The two conveyors in FIG. 1 may be arranged following one another in the same plane, for example, the feeding out surface 17 being omitted and the end pulleys 6,7 of the two conveyors partly engaging in one another, which can be solved simply in that either the second end pulley 6 of the first conveyor 1 or the first end pulley 7 of the second conveyor 2 is in the form of two separate pulleys situated at some distance from each other. Naturally, in this case the conveyor passing over these pulleys must be in the form of two conveyor belts or chains running next to one another.

The principles, preferred embodiments and modes of operation of the present invention have been described in the foregoing specification. The invention which is intended to be protected herein should not, however, be construed as limited to the particular forms disclosed, as there are to be regarded as illustrative rather than restrictive. Variations and changes may be made by those skilled in the art without departing from the spirit of the present invention.

What is claimed is:

1. A method for transferring an object from a first conveyor moving at a first speed to a second conveyor moving at a second speed which is higher than said first speed, comprising:
   providing said first conveyor with a pair of pulleys of predetermined radius; said first conveyor comprising a flat run and an arcuate run that extends over said pair of pulleys;
   spacing the second conveyor with respect to the first conveyor;
   contacting the object with an urging element positioned on the first conveyor to push the object at the speed of the flat run of the first conveyor;
   providing the urging element with a contact surface at an end displaced from the conveyor belt;
   increasing the linear speed of a free end portion of the urging element by tipping the urging element forwardly as it passes around the arcuate run of the first conveyor;
   providing the urging element with a predetermined length which is greater than the predetermined radius of one of said pair of pulleys;
   accelerating the object by contacting the object with said contact surface of the urging element during the increase of speed; and
   contacting the object with a portion of the second conveyor after the object has been accelerated by the urging element.

2. The method of claim 1 wherein the forward tipping of the urging element is effected by causing a conveyor belt of the first conveyor to change its direction of movement.

3. The method of claim 1 wherein the speed of the first conveyor plus the additional speed caused by the tipped urging element give a combined speed which substantially corresponds to the speed of the second conveyor.

4. A feeding arrangement for feeding objects, comprising:
   a first conveyor having an endless conveyor belt and a plurality of first load-contacting elements positioned at regular intervals thereon and projecting outwardly therefrom at a substantially right angle with respect to said conveyor belt, each of said load contacting elements being adapted for contacting a load to move said load at a first speed defined by the speed of said conveyor belt;
   a second conveyor spaced from the first conveyor and provided with an endless conveyor belt and being driven at a second speed higher than said first speed and provided with a plurality of second load-contacting elements positioned at regular intervals thereon;
   the first load-contacting elements having an end displaced from the first conveyor belt;
   upstream and downstream pulleys of predetermined radius supporting the endless belt of the first conveyor, each of said first load-contacting elements defining a predetermined length between the first conveyor belt and the end of the load-contacting element, said predetermined length being greater than the predetermined radius of said downstream pulley;
   the ends of the first load-contacting elements being arranged so as to accelerate said load from said speed of the first conveyor to said speed of the second conveyor as the load-contacting element passes around the downstream pulley;
   said second conveyor spaced from said first conveyor such that said second load-contacting elements do not contact said load until after said load has been accelerated by one of said first load-contacting elements.

5. The feeding arrangement of claim 4 wherein said tipping means is located at a point at which the first conveyor ceases moving said load.

6. The feeding arrangement of claim 5 wherein said tipping means includes an end pulley of said first conveyor.

7. The feeding arrangement of claim 6 wherein said length of the load-contacting element is 1 to 3 times greater than the radius of the end pulley.

8. The feeding arrangement of claim 4 wherein said orientation changing means includes a cam.

9. The feeding arrangement of claim 8 wherein said load-contacting elements are attached to the conveyor belt of the first conveyor in such a manner that they can swivel.

10. The feeding arrangement of claim 4 wherein a longitudinal axis of the second conveyor parallels a longitudinal axis of the first conveyor.

11. The feeding arrangement of claim 4 wherein the second conveyor is driven at substantially twice the speed of the first conveyor.

12. The feeding arrangement of claim 10 further comprising a feeding out surface and wherein a point at which the first conveyor ceases moving said load is situated directly adjoining said feeding out surface and said feeding out surface is provided with cutouts for the load-contacting elements of the first conveyor.

13. The feeding arrangement of claim 12, wherein a distance between said point at which the first conveyor belt ceases contacting said load and a point at which the second conveyor begins moving said load is approximately equal to the length of the load-contacting elements of the first conveyor.

14. The feeding arrangement of claim 4 wherein each load-contacting element an outer end of its front side, seen in the direction of feeding, has a concave contact surface.

15. A conveying arrangement comprising:
   a first conveyor including:
   an endless conveyor belt;
   a plurality of elongated load-contacting elements having inner ends secured at regular intervals on said conveyor belt and projecting outwardly therefrom for moving a load at the speed of said conveyor belt, and
   first and second end pulleys around which said conveyor belt travels, wherein said second end pulley changes an orientation of each of said load-contacting elements in relation to a direction of movement of said conveyor belt in order to increase the linear speed with which said load is moved;
   a feeding out surface arranged adjacent said second end pulley to comprise a continuation of the first conveyor belt in a horizontal direction,
   wherein said load-contacting elements move said load from the first conveyor onto said feeding out surface as said load-contacting elements travel around said second end pulley;
a second conveyor including:
a second endless conveyor belt,
upstream and downstream pulleys around which said second endless conveyor belt travels, the axis of the second pulley of the first conveyor being upstream of the axis of the upstream pulley of the second conveyor;
a plurality of load-contacting elements secured at regular intervals on said second conveyor belt for contacting and moving said load while said load is on the feeding out surface;
wherein said second conveyor runs at a higher speed than said first conveyor.

16. The conveying arrangement of claim 15 wherein said first conveyor further includes:

an axle connecting each load-contacting element to said conveyor belt whereby each load-contacting element can swivel around said axle with respect to said conveyor belt;
a roller secured to the inner end of each load-contacting element; and
a cam in which said roller runs, wherein said cam, by pivoting each load-contacting element around said axle, changes said orientation of said load-contacting element in relation to said direction of movement of said belt.

17. The feeding arrangement of claim 15, wherein a length of the load-contacting element is greater than a radius of the end pulley.

18. The feeding arrangement of claim 15, wherein each load-contacting element at an outer end of its front side, seen in the direction of feeding, has a concave contact surface.

* * * * *